Feb. 16, 1937.  L. H. JOHNSON  2,070,832
STEERING DEVICE
Filed May 7, 1935  2 Sheets-Sheet 1

Inventor
L. H. JOHNSON
By Barry & Cyr
Attorneys

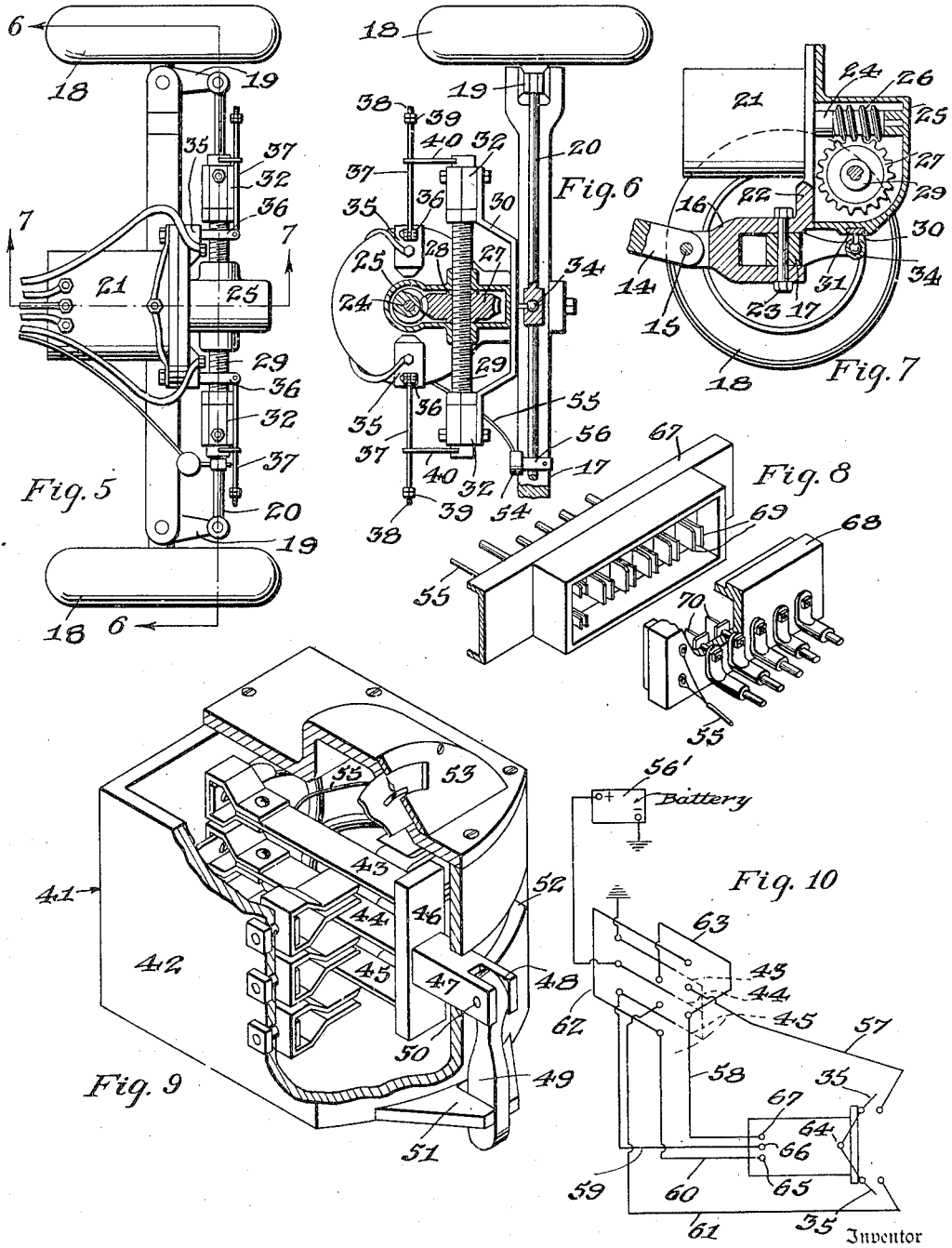

Patented Feb. 16, 1937

2,070,832

UNITED STATES PATENT OFFICE 2,070,832

STEERING DEVICE

Louis H. Johnson, San Antonio, Tex., assignor to Southern Equipment Company, San Antonio, Tex., a corporation of Texas Application May 7, 1935, Serial No. 20,246

1 Claim. (Cl. 180—79.1)

This invention relates to improvements in steering devices for two and four-wheel motor trailers.

The primary object of the present invention is to provide a steering device operated by electrical power for changing the angular position of the wheels of a trailer to facilitate convenient maneuvering thereof, particularly in close quarters.

Another object is to provide with an electrical steering device of this character, means for energizing the electric motor and causing it to turn the wheels of a trailer to the right or left under control of a switch operated by the driver of the primary vehicle.

A further object is to provide improved means for automatically shutting off the electric motor when the trailer wheels have been moved a predetermined distance to the right or left.

A still further object is to furnish with a device of this character, improved means controllable by a central position of the switch for locking the wheels of the trailer in their normal position, that is, in alignment with the rear wheels of the motor vehicle to which the trailer is coupled.

Another object is to supply novel means for coupling that portion of the wiring system which is arranged in the motor vehicle, with the remaining portion of the wiring system arranged on the trailer, whereby a complete circuit may be obtained from the source of electric supply located on the motor vehicle, to the electric steering devices of various trailers.

With the foregoing objects outlined and with other objects in view which will appear as the description proceeds, the invention consists in the novel features hereinafter described in detail, illustrated in the accompanying drawings, and more particularly pointed out in the appended claim.

In the drawings:

Fig. 5 is a top plan view of the front axle steering portion of a four-wheel trailer.

Fig. 6 is a sectional view of the steering mechanism, taken on the line 6—6 of Fig. 5.

Fig. 7 is a sectional view of the steering mechanism, taken on the line 7—7 of Fig. 5.

Fig. 8 is a perspective view of the two coupling blocks for connecting the wiring system of the motor vehicle and trailer.

Fig. 9 is a perspective view, with parts broken away to facilitate illustration, of the switch box for controlling the operation of the electric motor.

Fig. 10 is a diagram of the wiring system used in carrying out my invention.

Figure 1:
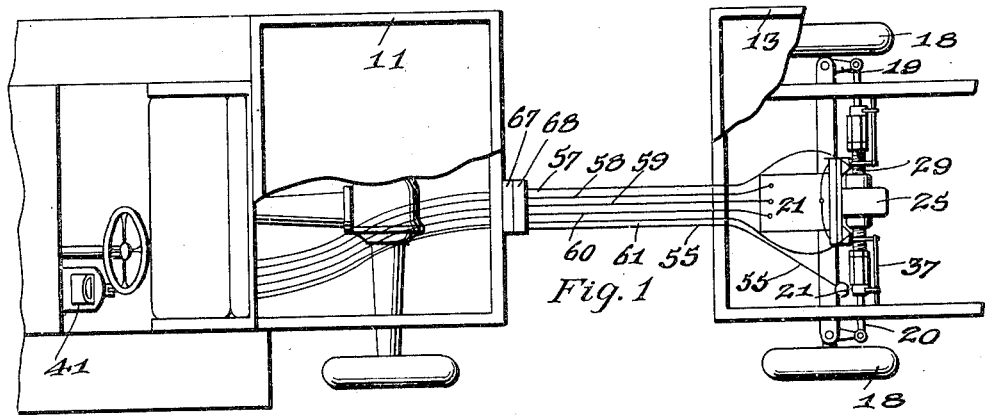
Fig. 1 is a top plan view of a four-wheel trailer coupled to the rear end of a motor vehicle.

Referring to the drawings in detail, 11 designates the chassis of a motor vehicle used for propelling the trailer. The chassis may be connected to a two or four-wheel trailer 12, 13, respectively, by any suitable means. In Fig. 7, I have shown a tongue 14 pivotally connected at 15 to a yoke 16 secured to the front axle 17 of a four-wheel trailer, for the purpose of coupling this type of trailer to a motor vehicle.

In accordance with the present invention, either the front or rear wheels, or both the front and rear wheels of a trailer may be steered by the use of my improved device, and such wheels 18, will be coupled with the axle 17 thereof by steering knuckles or joints 19 permitting said wheels to turn about vertical axes for steering purposes. The steering knuckles are coupled by a tie rod 20, whereby the wheels 18 may be moved in unison or caused to perform identical steering movements.

Referring specifically to Figs. 5, 6 and 7, wherein I have shown my improved steering device mounted on the front axle of a four-wheel trailer, 21 designates a reversible motor secured to a flange 22 extending upwardly from and preferably integrally united with the yoke 16. As may be noted in Fig. 7, the yoke is pivotally connected to the axle 17 by means of a king pin 23.

A drive shaft 24 journaled in a housing 25 and driven by the motor 21 is provided with a worm gear 26 adapted to engage a gear wheel 27 having a threaded bore 28. A reciprocating screw or shaft 29 is threaded into the bore of the gear wheel, and when the motor is operated, the worm gear on the drive shaft will rotate the gear wheel in either direction, depending on the direction of rotation of the motor, and as the wheel rotates, the screw will be moved axially in the housing while the wheel will be prevented from moving laterally. A yoke member 30 slidably engages a groove 31 in the bottom of the housing. The ends of the member 30 are secured to sleeves 32 which are fixedly connected to the opposite ends of the screw, whereby the latter is prevented from rotating in the bore of the gear wheel. The yoke member 30 is connected to the tie rod 20 by a ball joint 34, and any axial movement of the screw 29 will be transmitted through the yoke, the ball joint and the tie rod to the steering knuckles 19 for varying the angular position of the supporting wheels 18.

In order to prevent the screw 29 from moving axially too far and thus causing breakage of the parts, I provide a safety device connected to the power supply control and the steering mechanism for automatically shutting off the motor when the screw has reached predetermined positions in its axial movement.

This safety device consists of safety switches 35 mounted on each side of the gear housing 25. Each switch has an arm 36 connected to a rod 37. The rods are screw threaded at their outer ends, as indicated at 38, to receive adjusting nuts 39. A bracket 40 is secured to each end of the screw 29, and these brackets extend outwardly from the screw toward the rods 37, and are provided with apertures to receive said rods. The switches 35 are normally closed, that is, the current from the source of supply is free to pass through them to the motor, as will hereinafter be more fully explained. By adjusting the nuts 39 on the rods 37, it will be seen that as the screw moves axially, one of the brackets will abut against the nut 39 and pull the switch 35 open, thereby breaking the circuit from the source of supply to the motor and stopping the operation of the steering device. Of course, the nuts 39 will be so adjusted on the rods 37 as to cause a break in the circuit before the steering knuckles 19 reach the limit of their travel.

In order to properly control the operation of the steering device, I provide a control switch, (Fig. 9), designated generally at 41, which includes a casing or housing 42 adapted to be located convenient to the driver of the motor vehicle. The casing is preferably secured to the dash board of the vehicle adjacent the steering wheel thereof. The switch control comprises a double throw knife switch, composed of three blades 43, 44, 45, the inner ends of said blades being pivotally or otherwise movably connected to the inner wall of the casing, and the outer ends of said blades being secured to a block 46 of non-conducting material. The block 46 carries a projection 47 having a notch 48 in its outer end adapted to receive a handle 49. The handle is pivoted within said notch by means of a pin 50. When the switch is in neutral position, the handle fits into a slotted projection 51 which extends from the base of the casing or box 42. In this position, no current flows from the source of supply to the motor, and consequently, as the handle is fixed against accidental displacement, there is no possibility of starting the motor until the handle 49 has been raised and shifted to the right or left. The front wall of the casing is provided with a slot 52 to permit shifting of the switch from operative to inoperative position.

For the purpose of visually indicating to the operator of the motor vehicle, the position of the steering wheels on the trailer, a dial 53 (Fig. 9) is mounted on the switch box, and is connected to the registering mechanism 54 on the axle of the trailer by means of the wiring 55. An arm 56 connects the registering mechanism to the tie rod 20, and any movement of the latter will be indicated on the dial 53, both as to magnitude and direction. With regard to the indicating means, it may be stated that the construction and operation of this device is similar to the conventional electric gasoline gauges.

Referring to the wiring system employed for actuating the electric motor, it will be observed, (Fig. 10), this system consists essentially of a battery 56', five major lines 57, 58, 59, 60 and 61, two short circuits 62 and 63, and the three bladed switch above described. Assuming the switches 35 on the motor are in closed position, and the handle 49 of the main switch is moved to the right hand position, along the dotted arc in Fig. 10, the current from the positive post of the battery, which is delivered to the center blade 44 of the switch, passes through the line 57 and thence to the motor terminal 64 through one of the switches 35. The upper blade 43 of the switch, which is grounded, makes connection with the short circuit 62, this circuit being tied into the line 60 which leads to the motor terminal 65. The lower blade 45 of the switch makes connection between the lines 58 and 59, thereby connecting the motor terminals 66 and 67. When the switch handle 49 is in this position, the motor 21 will be operated, and this will cause the screw 29 to move to the right until the limit of travel of the tie rod 20 is reached, at which time contact of one of the auxiliary switches 35 connecting the line 57 with the motor terminal 64 will be broken, due to the action of the bracket 40 on the rod 37, and this break in the circuit, will, of course, shut off the motor.

When the switch handle is moved to the left, along the dotted arc in Fig. 10, the center blade 44 of the switch will connect the positive lead from the battery with the line 61 leading to the motor terminal 64 through the switch 35. The top blade 43 of the switch connects the ground to the short circuit 63 which ties into the line 58 leading to the motor terminal 67. The lower blade 45 of the switch connects the lines 59 and 60, thereby inducing a flow of current between the motor terminals 65 and 66, and completing the circuit. The operation of the motor 21, when the switch is in this position, causes the screw 29 to move to the left until the circuit is broken either through a movement of the switch handle 49 to neutral position, or the automatic action of one of the switches 35 when the tie rod 20 reaches the limit of its travel in one direction.

As above stated, the movements of the screw and tie rod are indicated on the dial 53 located in the motor vehicle, and as the screw reaches the limit of its axial movement in one direction, the operator may shift the main switch handle to the opposite side of the control casing in order to reverse the motor and return the screw and the supporting wheel to central or normal positions. When the wheels are returned to their normal position, in alignment with the rear wheels of the motor vehicle propelling the trailer, the switch handle is lowered into engagement with the slotted projection 51, and will remain in this position until it is desired to again vary the angular position of the trailer wheels.

In order to join that portion of the wiring system which is arranged in the motor vehicle with that portion directly connected to the electric motor, I provide coupling blocks 67 and 68 having switch points 69, 70. As will be seen from the drawings, each block may be fixed to its respective vehicle, that is, the block 67 may be permanently secured to the rear portion of the motor vehicle, while the block 68 may be fixed to the front portion of the trailer, and when the latter is coupled to the motor vehicle, the switch points of the respective blocks will form a connecting means for the entire circuit from the source of supply of the motor.

Figure 2:
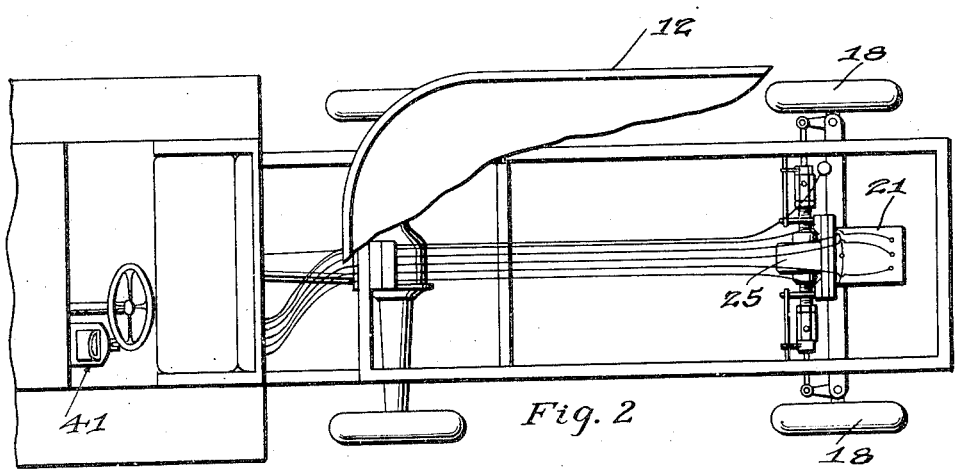
Fig. 2 is a similar view of a two-wheel trailer connected to the rear end of a motor vehicle.
Figure 3:
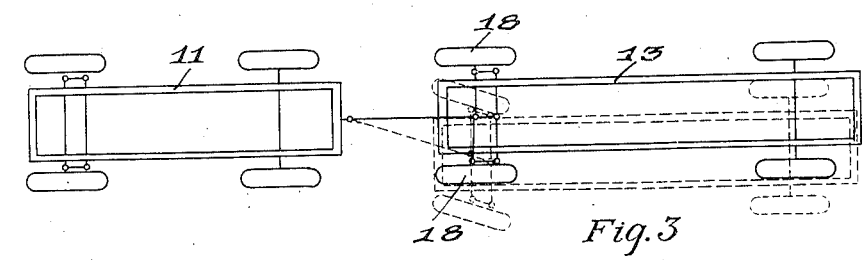
Figs. 3 and 4 are diagrammatic views of trailers of the four and two-wheel type, respectively, coupled with motor vehicles.
Figure 4:
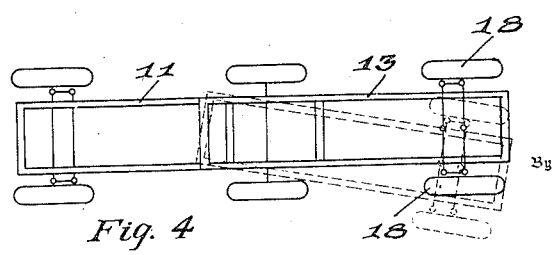

While I have described the invention as applied to a four-wheel type of trailer, it will be understood that the same may also be used with a two-wheel trailer, as illustrated in Figs. 2 and 4, in which case, the steering mechanism will be bolted directly to the axle, the latter being connected to the trailer chassis. It will also be understood that my steering device may be employed for steering rear wheels as well as front wheels of a four-wheel trailer or the like without changing the construction or operation of the device herein described and illustrated.

From the foregoing it is believed that the construction, operation and advantages of my invention may be readily understood by those skilled in the art, and it is manifest that changes may be made in the details disclosed without departing from the spirit of the invention as expressed in the claim.

What I claim and desire to secure by Letters Patent is:

In combination with a vehicle having an axle, supporting wheels mounted for steering movement on said axle, and a tie rod operatively connected to said wheels for steering the latter, of a unitary steering device supported by said axle and operatively connected to said tie rod for actuating the latter, said device including a reversible electric motor, a casing, a horizontally disposed screw extending through said casing, a gear arranged within the casing and rotatably mounted on the screw for moving the latter in opposite directions, transmission means operatively connecting the gear and motor whereby the latter drives said gear, a yoke depending from the screw and having its ends fixed to the latter and guided laterally by said casing, a universal joint connecting the yoke to the tie rod, safety switches for said motor, means operatively connecting said switches to said screw for actuating one or the other of said switches when the screw moves axially a predetermined distance in either direction, and a main switch for controlling the motor.

LOUIS H. JOHNSON.